April 12, 1938.   V. GRONBERG   2,113,804
CREDIT REFERENCE EQUIPMENT
Filed Oct. 9, 1937   2 Sheets-Sheet 2
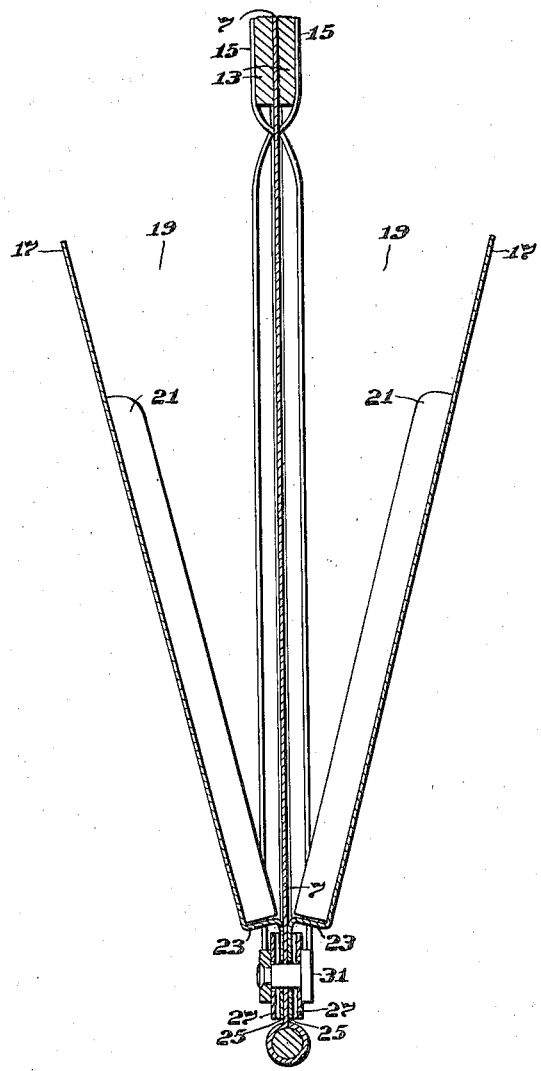
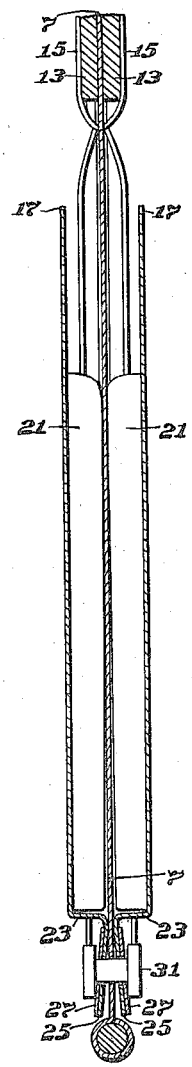
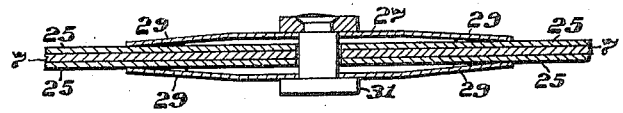
INVENTOR
*Victor Gronberg*
BY *Emery, Booth, Townsend, Miller & Weidner*
ATTORNEYS Patented Apr. 12, 1938

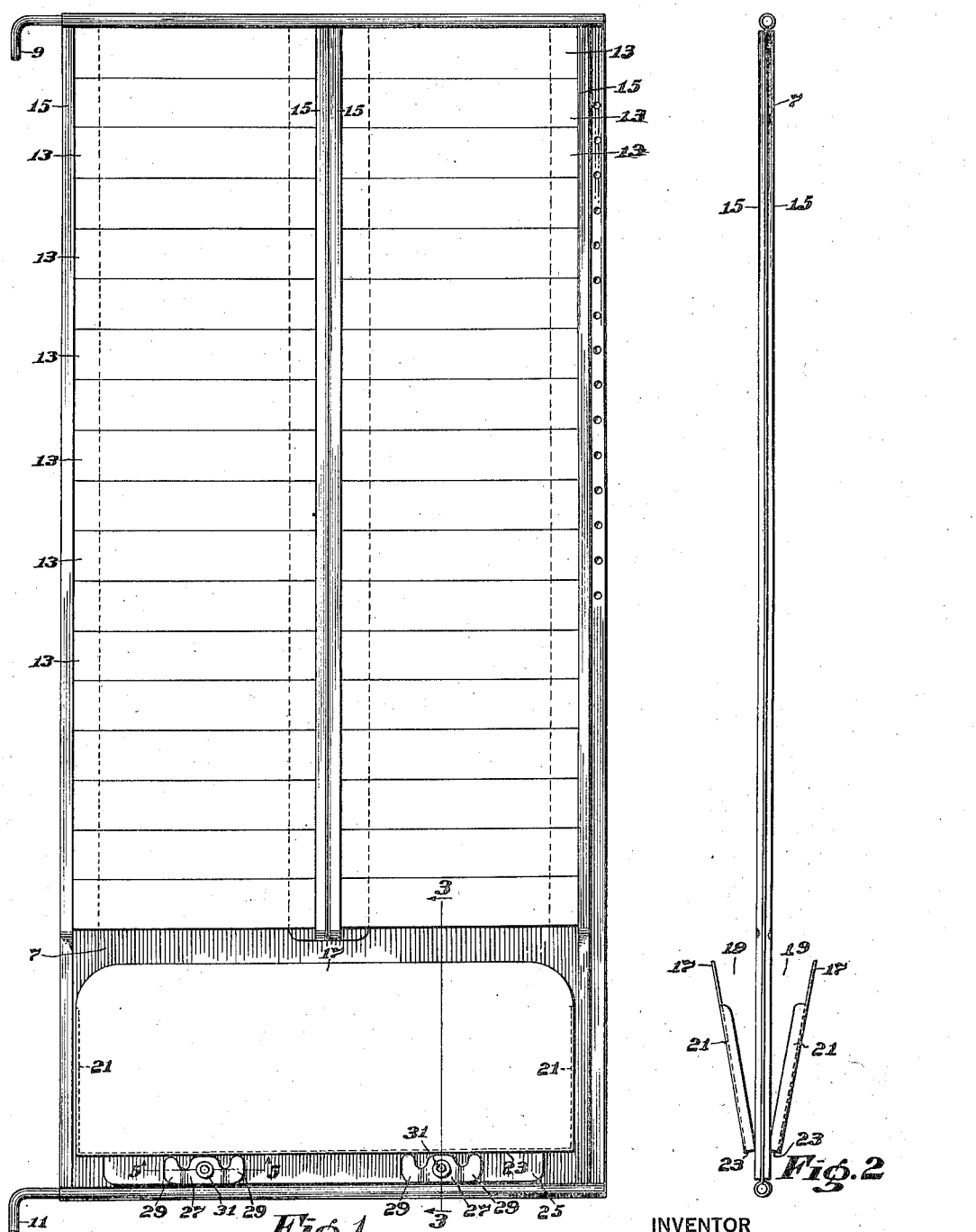

2,113,804

UNITED STATES PATENT OFFICE 2,113,804

CREDIT REFERENCE EQUIPMENT

Victor Gronberg, Jamestown, N. Y., assignor to Art Metal Construction Company, Jamestown, N. Y., a corporation of Massachusetts Application October 9, 1937, Serial No. 168,243

10 Claims. (Cl. 40—124)

This invention relates to credit reference equipment for use at the credit authorization desk of a store to enable sales slips of charge customers to be compared with cards bearing customers' names, addresses, and credit ratings. The aim of the invention is to provide equipment which will enable the work of the credit department to be speeded up and to enable the clerks to keep their accounts posted to a much closer date and time of day than has been possible in the use of former equipment and methods.

To this end, the invention contemplates an index equipment comprising vertical panels, each equipped with one or more vertical series of cards bearing customers' names, addresses and credit ratings, for comparison with sales slips for the authorization of the charges, and a pocket on each panel in which the sales slips may be placed, sorted, and stored temporarily pending the posting of the charges to the customers' accounts. In accordance with usual practice, after a sales slip is made out in the sales department, the name and address of the customer is telephoned to the credit desk, together with the amount of the charge, the credit clerk refers to the card index of customers' names, addresses and credit ratings on one of the panels, and if the charge is approved, the goods are delivered to the customer and the sales slip is sent to the credit department. If the goods are to be sent to the customer, the telephone call is omitted. In either case, when the sales slip comes to the credit desk, the slip is dropped into the pocket on the panel, the slips are sorted at the time, and, subsequently, the slips are taken from the pockets and referred to the accounting and shipping departments for posting and completion of the transaction. The greatest advantage of this system over former methods is that by the time the sales slips reach the accounting department little, if any, sorting of the sales slips is necessary because the slips have been pre-sorted in the pockets during the credit authorization. It follows, therefore, that the work is expedited and the postings can be kept up more closely than has been possible heretofore.

The invention will best be understood by reference to the following description when taken in connection with the accompanying drawings of one specific embodiment thereof, while its scope will be pointed out more particularly in the appended claims.

In the drawings:

Fig. 1 is a front elevation of a credit reference equipment embodying the invention;

Fig. 2 is an elevation of the same as viewed from the right-hand side of Fig. 1;

Fig. 3 is a sectional view on an enlarged scale on line 3—3 of Fig. 1, showing the pockets in normal position;

Fig. 4 is a sectional view similar to Fig. 3 but showing the pockets collapsed; and Fig. 5 is a sectional view on an enlarged scale on line 5—5 of Fig. 1.

Referring to the drawings and to the embodiment illustrated therein by way of example, there is shown a credit reference equipment comprising a vertical panel 7 (see Fig. 1) provided with upper and lower pintles 9 and 11 by which it may be supported on an appropriate support to swing to and fro. Either or both sides of the panel may be equipped with reference cards and pockets, though the present example employs both sides. As herein shown, each side of the panel carries two vertical series of reference cards 13 whose ends are received in guides or channels 15, into which they are introduced by bending the cards. The cards are intended to receive the names, addresses and credit ratings of the customers.

At either the top or bottom of each side of the panel, herein at the bottom, the panel is equipped with a pocket herein conveniently formed by a plate or wall 17 which slopes upwardly and forwardly from the panel and has its upper end separated from the panel by a space or opening 19 for the introduction of sales slips as they come from the sales department. As shown, each wall is provided along each of its vertical edges (see Figs. 3 and 4) with flanges 21 which serve not only to retain the sales slips in place, but also to serve as stops to limit inward movement of the walls when, as in the present example, the walls are flexibly mounted to enable them to move toward and from the panel. Each wall, moreover, is provided with an inward offset forming a ledge 23 at the bottom of the pocket for the sales slips to rest upon, and a marginal flange appropriately attached to the panel.

To provide a flexibility of attachment of the wall to the panel, I provide springs 27, best shown in Fig. 5, having inwardly directed ends 29 which rest against the flanges 25, and a fastener, herein a rivet 31 which extends through the panel, the flanges, and the spring and which is long enough to permit the springs normally to assert themselves to hold the walls 17 inclined outwardly, as shown in Fig. 3. When, however, an inward pressure is exerted on the wall, as when two adjacent panels are brought close together, the spring yields and allows the wall to approach the panel (see Fig. 4). Thus, the pocket occupies but little space when the panels are closely compacted, but when they are spread apart, the walls spring outwardly into the position shown in Fig. 3, providing ample space for the introduction of the sales slips.

Having thus described one embodiment of the invention, but without limiting myself thereto, what I claim, and desire by Letters Patent, to secure is:

1. Credit reference equipment comprising, in combination, a vertical panel, a vertical series of cards for customers' names, addresses, and credit standing, and a pocket comprising a wall sloping upwardly and fowardly from said panel and having its upper edge separated from said panel by an opening for the introduction, sorting and temporary storage of sales slips for comparison with said cards, said wall being flexibly mounted on said panel to enable said wall to move toward and from said panel.

2. Reference equipment comprising, in combination, a vertical card index panel, and a pocket carried by said panel, said pocket comprising a wall at its front provided along its vertical edges with flanges directed rearwardly toward and stopping short of said panel, and a ledge adjacent the bottom of said wall and extending from the latter rearwardly toward said panel.

3. Reference equipment comprising, in combination, a vertical card index panel, and a pocket carried by said panel, said pocket comprising a wall which is offset inwardly toward said panel providing a ledge and a downwardly directed flange attached to said panel.

4. Reference equipment comprising, in combination, a vertical card index panel, and a pocket carried by said panel, said pocket comprising a wall provided along its vertical edges with flanges directed toward said panel, said wall being offset inwardly toward said panel providing a ledge and a downwardly directed flange attached to said panel.

5. Reference equipment comprising, in combination, a vertical card index panel, and a pocket carried by said panel, said pocket comprising a wall which is offset inwardly toward said panel providing a ledge and a downwardly directed flange, and a spring which tends to urge said flange toward said panel and yieldingly to maintain said wall inclined upwardly and outwardly from said panel.

6. Reference equipment comprising, in combination, a vertical card index panel, and a pocket carried by said panel, said pocket comprising a wall which is offset inwardly toward said panel providing a horizontal ledge and a downwardly directed flange, a spring which tends to urge said flange toward said panel and yieldingly to maintain said wall inclined upwardly and outwardly from said panel, and a member which holds said spring under stress.

7. Reference equipment comprising, in combination, a vertical, card index panel, and a pocket carried by said panel, said pocket comprising a wall at the front which slopes upwardly and outwardly from said panel and has a portion offset inwardly forming a ledge, and a downwardly directed flange attached to said panel.

8. Reference equipment comprising, in combination, a vertical, card index panel, and a pocket carried by said panel, said pocket comprising a wall which slopes upwardly and outwardly from said panel and has a portion offset inwardly forming a ledge and a downwardly directed flange flexibly connected with said panel.

9. Reference equipment comprising, in combination, a vertical, card index panel, and a pocket comprising a wall which diverges upwardly from said panel and is flexibly related thereto so that its upper edge can approach and recede from said panel.

10. Reference equipment comprising, in combination, a vertical, card index panel, and a pocket comprising a wall which diverges upwardly from said panel and is flexibly related thereto so that its upper edge can approach and recede from said panel, said wall being provided with means to limit its approach to said panel.

VICTOR GRONBERG.